United States Patent [19]

MacDougall et al.

[11] Patent Number: 4,992,905
[45] Date of Patent: Feb. 12, 1991

[54] HIGH CURRENT PRESSURE SENSITIVE INTERRUPTERS

[75] Inventors: Frederick W. MacDougall, Marion; Pamela E. Hardy, Mattapoisett, both of Mass.

[73] Assignee: Aerovox Incorporated, New Bedford, Mass.

[21] Appl. No.: 274,198

[22] Filed: Nov. 21, 1988

[51] Int. Cl.⁵ .............................................. H02H 7/16
[52] U.S. Cl. ..................................... 361/15; 361/272
[58] Field of Search ............ 361/15, 16, 17, 272–275, 361/37, 134, 125, 116

[56] References Cited

U.S. PATENT DOCUMENTS

| | | |
|---|---|---|
| 1,474,486 | 11/1923 | MacPherson . |
| 1,837,017 | 12/1931 | Conrad . |
| 2,668,935 | 2/1954 | Dubilier . |
| 2,846,627 | 8/1958 | Doughty, Jr. . |
| 3,553,542 | 1/1971 | Netherwood . |
| 4,059,848 | 11/1977 | Koel et al. ........................ 361/272 |
| 4,106,068 | 8/1978 | Flanagan ............................. 361/15 |
| 4,315,299 | 2/1982 | Saint Marcoux et al. ......... 361/274 |
| 4,339,786 | 7/1982 | Evans et al. ....................... 361/433 |
| 4,342,070 | 7/1982 | Evans ................................. 361/433 |
| 4,370,698 | 1/1983 | Sasaki ................................ 361/330 |
| 4,639,827 | 1/1987 | Strange et al. .................... 361/272 |
| 4,661,876 | 4/1987 | Strange et al. ................. 361/272 X |
| 4,698,725 | 10/1987 | MacDougall et al. . |
| 8,707,780 | 12/1987 | Bentley et al. ..................... 361/15 |

FOREIGN PATENT DOCUMENTS 2511264  9/1976  Fed. Rep. of Germany ........ 361/15

OTHER PUBLICATIONS

Bentley et al., "Capacitor Circuit Interruption," U.S.S.N. 170,655, filed Mar. 17, 1988.
Bourbeau, "Capacitor Disconnection," U.S.S.N. 212,973, filed Jun. 29, 1988.

*Primary Examiner*—William M. Shoop, Jr.
*Assistant Examiner*—A. Jonathan Wysocki
*Attorney, Agent, or Firm*—Fish & Richardson

[57] ABSTRACT

An electrical device includes an electrical element; a container housing the electrical element; a rigid electrical terminal extending through a hole in a wall of the container; a bridge between the wall and the element, the bridge having an opening offset from an axis lying normal to the wall at the hole and the opening being aligned with a portion of the terminal; and an electrical connection made between the element and the terminal via the bridge opening, the connection being configured so that bulging of the wall causes the connection to break. Preferably, the container is a capacitor, and the electrical connection between the element and the terminal includes multiple separation points.

21 Claims, 3 Drawing Sheets

HIGH CURRENT PRESSURE SENSITIVE INTERRUPTERS

BACKGROUND OF THE INVENTION

This invention relates to pressure sensitive current interrupters for electrical components, such as capacitors.

When a typical can-type liquid dielectic capacitor deteriorates, gases are generated which can cause the can to burst. Known pressure sensitive interrupters use the gas pressure to break the connection between a terminal and its corresponding electrode, sufficiently early to prevent the container from bursting.

SUMMARY OF THE INVENTION

In general, the invention features a self-interrupting electrical device which is composed of an electrical element, a container housing the electrical element, a rigid terminal which extends through a hole in a wall of the container, a bridge member between the wall and the element, and an opening in the bridge member which is offset from an axis lying normal to the wall at the center of the hole and aligned with a portion of the terminal. An electrical connection is made between the electrical element and the terminal via the bridge opening and configured so that bulging of the wall causes the connection to break.

Preferred embodiments include the following features. The electrical device is a capacitor, and the capacitor cover is the terminal wall. The cover has a specific bulging area which bulges more than another area, and the opening in the bride is offset toward the area which bulges more. The electrical connection between the electrical element and the terminal contains a foil tab which extends from the element and is welded to the terminal. The capacitor has more than one terminal, and a central axis of each terminal is aligned with the axis normal to the wall at the hole.

The terminal includes a separate metal plate above the bride which is attached directly to the electrical connection. Extending from the metal plate are rigid projections which are each aligned with an opening in the bridge and project partway into the opening.

The construction of the pressure sensitive interrupter with multiple projection from each terminal allows for multiple, small weld connections to hold the projection tips onto the foil tabs coming from the electrical element in the capacitor. Consequently, the amount of movement required for disconnection of the joint between each projection tip and the foil tab is less than it would be if only one weld connection were used. The multiple weld connections also allow for better heat distribution and greater current carrying capacity. The projections may be in any desired orientation. One such orientation with the projections positioned toward the bulging area at the center of the capacitor cover maximizes the mechanical advantage gained by the movement of the bulging cover.

Other features and advantages of the invention will be apparent from the following description of the preferred embodiment thereof, and from the claims.

DESCRIPTION OF THE PREFERRED EMBODIMENT

We first briefly describe the drawings.

DRAWINGS

STRUCTURE

Figure 1:
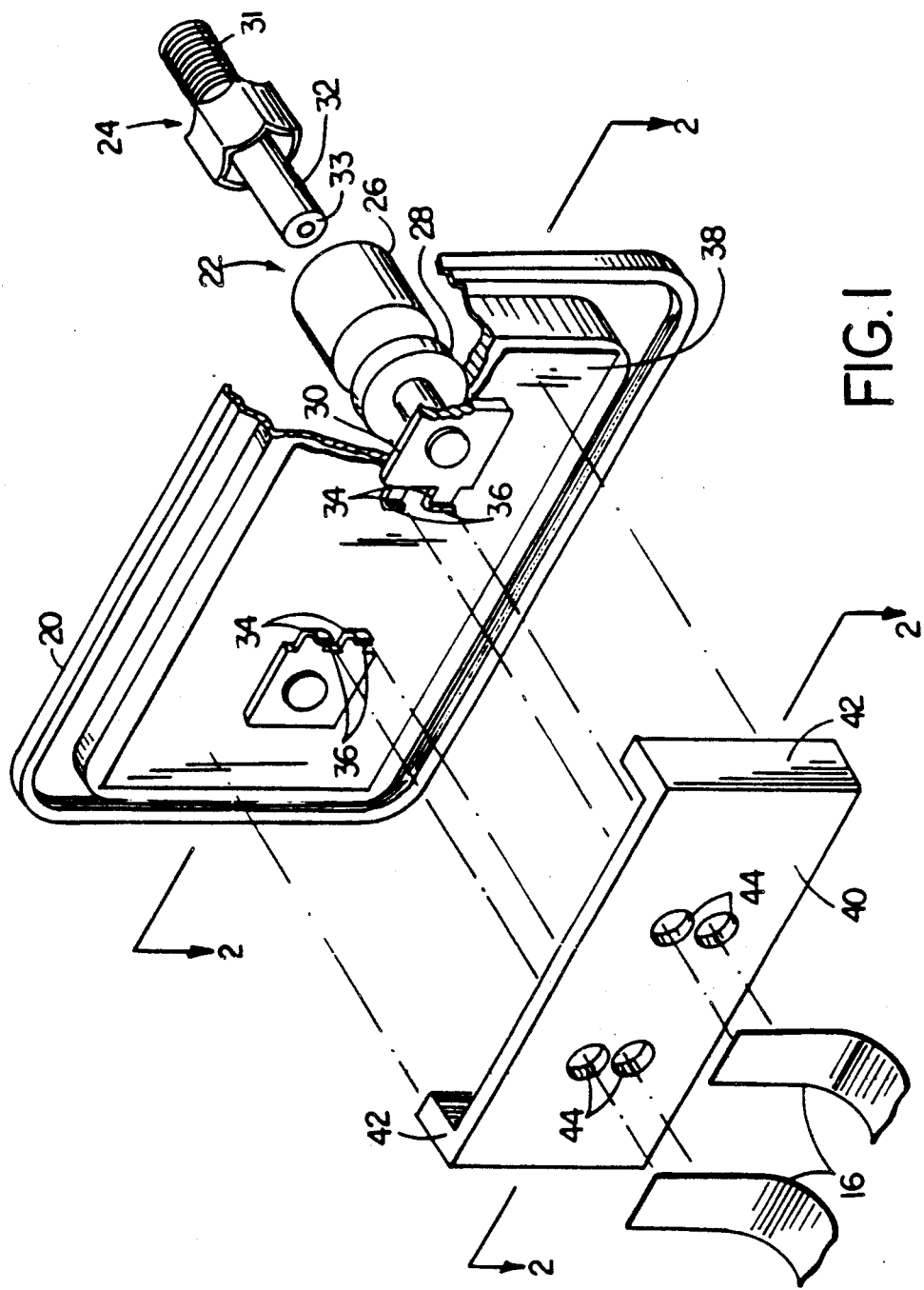
FIG. 1 is an exploded view of the capacitor cover, terminal assembly, bride member, and foil tabs.
Figure 2:
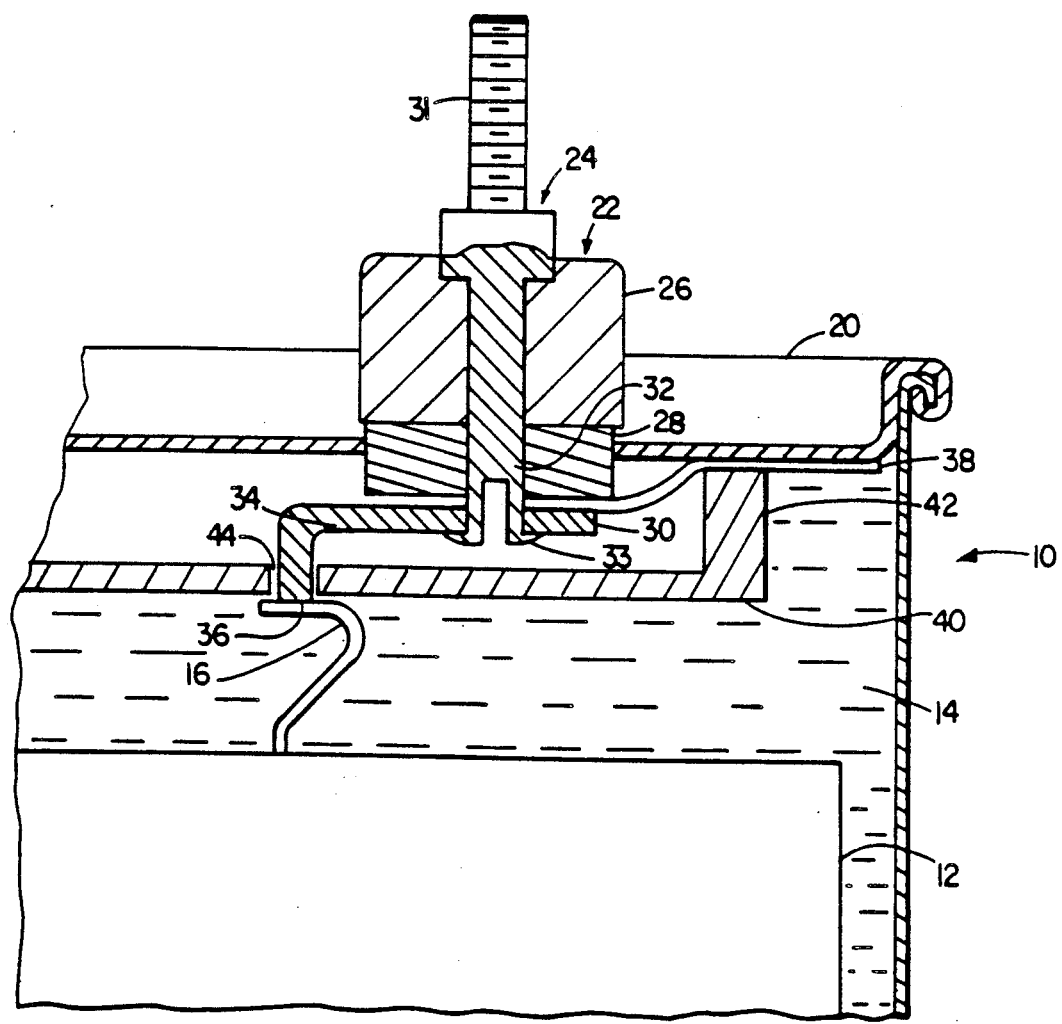
FIG. 2 is a partial cross-sectional view at 2—2 of FIG. 1, showing the cover in relationship to the electrical capacitor.

Referring to FIGS. 1 and 2, in a can-type capacitor 10, a rolled capacitor section 12 is submerged in a dielectric liquid 14 within the can. A cover 20 contains two terminal assemblies 22 (only one is shown). Each terminal has a feed through 24 (made from threaded terminal stud 31 and orbital rivet 32) which is inserted through ceramic bushing 26, through rubber washer 28 (which is itself lodged in a hole in the cover 20 of the capacitor) and finally through metal terminal plate 30. The orbital rivet 32 is spread at nd 33 with an orbital rivet machine to secure it to terminal plate 30. Two projections 34 protrude from each terminal plate 30 toward the center of the capacitor cover 20, an area which bulges more under pressure than do other portions of the cover. The projections are bent down at 90°, ending in tips 36, appropriate for welding. On the underside of the capacitor cover 20 is a paper insulator 38 and a bride 40 with ends 42 at right angles which bear (via paper insulator 38) against the underside of the metal cover when the cover 20, terminal assemblies 22, paper insulator 38, and bridge 40 are in position. Located in the bridge 40 are openings 44, each offset towards the center of the cover from the terminal and oriented to receive a tip 36. The bridge 40 is scaled so that each tip 36 just protrudes through its corresponding opening 44 and is flush with the underside of the bride. Each tip 36 is welded to a foil tab 16 which is connected to an electrode in the internal capacitor roll section 12.

OPERATION

Figure 3:
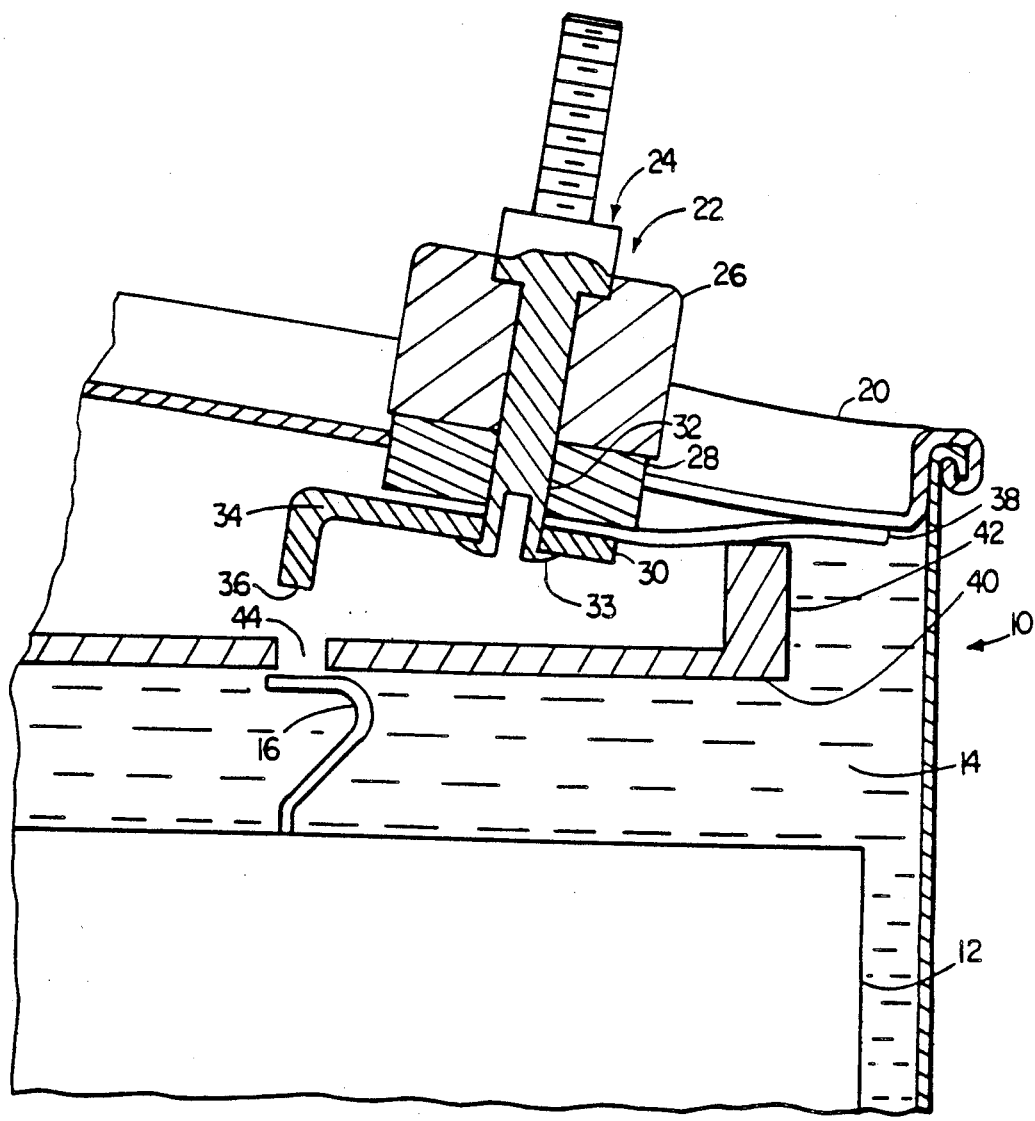
FIG. 3 is the same view as Fi. 2 when the pressure sensitive interrupter is in operation.

Referring to FIGS. 2 and 3, when the liquid dielectric begins to deteriorate, the gases that are generated will cause the capacitor cover 20 to bulge first at its center, the center being the part of the cover that is furthest removed from any anchoring point. The bride 40 is relatively stiff and will remain stationary; therefore, tension is put on the welded connections between the tips 36 of projections 34 and the foil tabs 16. After a certain amount of gas build-up, the bulging of the cover causes the welds to break, allowing the bulging cover 20 to pull the tips 36 away from the openings 44 in the bridge member 40, and leaving the foil tabs 16 from the electrodes behind under the bride 4, as shown in FIG. 3. As the center of the cover will bulge more than the edge areas, the center orientation of the projection tips 36 provides for quick response of the interrupter to the gas pressure build up. The distance of separation between the tips 36 and the foil tabs 16 is greater than if the main body of the terminal is connected directly to the tab. The tips are moved far enough away from their corresponding openings that an inadvertent reconnection with the foil tabs is unlikely.

Other embodiments are within the following claims. For example, more than two projections can be used, protruding from each terminal plate, or the terminal can have projections in the form of multiple nibs extending vertically downward directly from the orbital rivet 32. The terminal plates can be any shape where the projections are generally oriented toward the center of the capacitor cover.

We claim:

1. A self-interrupting electrical device comprising an electrical element;
   an container housing said element, said container comprising a wall having a first, peripheral region and a second, center region spaced from said first, peripheral region, said wall in said first region being joined to an adjacent element of said container, said all, upon generation of gas within said container, being adapted to bulge to a greater degree in said second region than in said first region,
   a rigid electrical terminal extending through a hole in wall of said container;
   a bridge element disposed between said wall and said electrical element, said bridge having at least one opening offset from an axis lying normal to said wall sat the center of said hole, said at least one opening being spaced from said first region and being positioned relatively closer to said second region compared to the position of said hole, at least one opening being aligned with a corresponding portion of said terminal; and an electrical connection made between said electrical element and said terminal via said at least one opening in said bridge, said connection being configured so that bulging of said wall causes said connection break.

2. The electrical device of claim 1 wherein said container includes a cover comprising said wall.

3. The electrical device of claim 1 wherein a central axis of said terminal is aligned with said axis normal to said wall at said hole.

4. The electrical device of claim 1 wherein said electrical connection between said electrical element and said terminal comprises a welded connection.

5. The electrical device of claim 4 wherein said electrical connection includes a foil tab between said element and said welded connection.

6. The electrical device of claim 1 wherein said terminal includes a metal plate located between said bridge and said wall, aligned with said opening, and attached to said connection.

7. The electrical device of claim 1 or claim 6 wherein said terminal or said metal plate includes a projection aligned with said opening and attached to said connection.

8. The electrical device of claim 7 wherein said projection projects at last partway into said opening.

9. The electrical device of claim 7 wherein said projection is smaller in cross-sectional area than said terminal.

10. The electrical device of claim 7. comprising a plurality of said projections and said bridge openings.

11. The electrical device of claim 1 comprising two said terminals, extending through two said holes, and two said openings, wherein two said axes lying normal to said wall at said two holes intersect said bridge and said two openings lie along a line connecting the two points where said axes intersect said bridge.

12. The electrical device of any one of claims 1, 2, 3, 4, 6 wherein said electrical device is a capacitor.

13. A self-interupting electrical device comprising an electrical element;
    a container housing said element;
    a container wall having a first, peripheral region and a second, center region spaced from said first, peripheral region, said wall in said first region being joined to an adjacent element of said container, said wall, upon generation of gas within said container, being adapted to bulge to a greater degree in said second region than in said first region;
    a rigid electrical terminal extending through a hole in said container wall, said terminal having a plurality of projections;
    a bridge element disposed between said container wall and said element, said bridge element having a plurality of openings offset from an axis lying normal to said cover at the center of said hole, said plurality of openings being spaced from said first region and being positioned relatively closer to said second region compared to the position of said hole, each said opening being in alignment with a corresponding one of said projections; and
    an electrical connection made between said electrical element and each said terminal projection via each said bridge opening, said connection being condigured so that bulging of said wall causes said connection to break.

14. The electrical device of claim 1, 6, or 13 comprising a plurality of said terminals.

15. The electrical device of claim 7 comprising a plurality of said terminals.

16. A self-interupting capacitor comprising an electrode in a roll section, submerged in a dielectric liquid;
    a container housing said electrode and said liquid;
    a container cover, said cover comprising a first, peripheral region and a second, center region spaced from said first, peripheral region, said cover in said first region being joined to an adjacent element of said container, said cove, upon generation of gas within said container, being adapted to bulge to a greater degree in said second region than in said first region;
    two rigid terminals, each said terminal extending through a hole in said container cover along an axis lying normal to said cover at the center of said of said hole, and each said terminal including a metal plate on the inside of said cover;
    a bridge disposed between said cover and said electrode;
    a plurality of openings in said bridge, offset from either said axis and spaced from either said axis, and said plurality of openings being spaced from said first region and being positioned relatively closer to said second region compared to the position of said hole;
    for each said terminal, extending from said metal plate, a plurality of projections, each said projection being oriented to extend into one of said openings in said bridge; and
    a welded electrical connection via each said opening in said bridge between the end of one of said projections and a lead extending to said electrode,
    whereby bulging of said cover to a greater degree in said second region than in said first region cause said connections to break.

17. A self-interrupting electrical device comprising an electrical element;
    a container housing said element;
    an electrical terminal extending through a hole in a wall of said container, said terminal having a plurality of projections;

a bridge between said wall and said element, said bridge having a plurality of projections;

a bridge between said wall and said element, said bridge having a plurality of openings, each said opening being in alignment with one of said projections; and a plurality of separate, discrete electrical connections made between said electrical element and said terminal by means of connection of each of said terminal projections via each of the said openings in said bridge, said connections being configured so that bulging of said wall causes said plurality of separate, discrete electrical connections to break.

18. The electrical device of claim 17 wherein at least one of said projections projects at least partway into the bridge opening with which said projection is an alignment.

19. The electrical device of claim 17 wherein said electrical connection between said electrical element and at least one of said terminal projections comprises a welded connection that breaks upon bulging of said wall.

20. The electrical device of claim 19 wherein said welded connection joins said projection to a foil tab extending from said element.

21. The electrical device of any of claims 13, 14, 16 or 17 wherein the electrical device is a capacitor.

* * * * *

UNITED STATES PATENT AND TRADEMARK OFFICE
CERTIFICATE OF CORRECTION

PATENT NO. : 4,992,905

DATED : February 12, 1991

INVENTOR(S): Frederick W. MacDougall and Pamela E. Hardy

It is certified that error appears in the above-identified patent and that said Letters Patent is hereby corrected as shown below:

Col. 1, line 34, "bride" should be --bridge--.

Col. 1, line 42, "bride" should be --bridge--.

Col. 2, line 4, "bride" should be --bridge--.

Col. 2, line 8, "Fi." should be --Fig.--.

Col. 2, line 21, "nd" should be --end--.

Col. 2, line 38, "bride" should be --bridge--.

Col. 2, line 55, "bride 4" should be --bridge 40--.

Col. 4, line 23, "condigured" should be --configured--.

Col. 4, line 29, "interupting" should be --interrupting--.

Col. 4, line 36, "cove" should be --cover--.

UNITED STATES PATENT AND TRADEMARK OFFICE
CERTIFICATE OF CORRECTION

PATENT NO. : 4,992,905

DATED : February 12, 1991

INVENTOR(S) : Frederick W. MacDougall and Pamela E. Hardy

It is certified that error appears in the above-identified patent and that said Letters Patent is hereby corrected as shown below:

Col. 4, line 43, delete first occurrence of "of said".

Signed and Sealed this

Fifth Day of January, 1993

*Attest:*

DOUGLAS B. COMER

*Attesting Officer*     Acting Commissioner of Patents and Trademarks